United States Patent [19]

Nicolayczik

[11] 4,105,043

[45] Aug. 8, 1978

[54] FAUCET VALVE

[75] Inventor: Hans Nicolayczik, Minheim, Fed. Rep. of Germany

[73] Assignee: American Standard Inc., New York, N.Y.

[21] Appl. No.: 803,174

[22] Filed: Jun. 3, 1977

[30] Foreign Application Priority Data

Jun. 12, 1976 [DE] Fed. Rep. of Germany ....... 2626386

[51] Int. Cl.² ............................................. F16K 25/00
[52] U.S. Cl. ................................ 137/454.2; 137/454.5; 137/625.31; 137/625.46
[58] Field of Search ............. 137/625.31, 454.2, 454.5, 137/625.46; 138/39

[56] References Cited

U.S. PATENT DOCUMENTS

| | | | |
|---|---|---|---|
| 2,935,293 | 5/1960 | Monson | 137/625.31 X |
| 3,123,900 | 3/1964 | Millar | 138/39 X |
| 3,144,878 | 8/1964 | Williams | 137/625.46 X |
| 3,807,455 | 4/1974 | Farrell | 137/625.31 |
| 3,831,621 | 8/1974 | Anthony | 137/625.31 X |

*Primary Examiner*—Harold W. Weakley
*Attorney, Agent, or Firm*—James J. Salerno, Jr.; Robert G. Crooks

[57] ABSTRACT

A valve is provided which is adapted for removable insertion in a valve body used for the control of the flow of fluid in a plumbing fixture. The valve includes a pair of discs in intimate movable contact with one another along a common interface. The first disc has at least one inlet aperture therethrough adapted to be positioned at one end in fluid communication with the inlet valve of the valve body and at the other end with the adjacent face of the second disc. The second disc has at least one passage aperture therethrough positioned so that relative movement between the discs will direct the apertures therein between the blocked shutoff position with the apertures of the discs out of alignment and the partially and completely overlapped position where fluid can flow through the discs. The discs are mounted in a sleeve and the discs and sleeve are connected to one end of a spindle. The interconnected discs, sleeve and spindle are removably mountable in a valve body. At least one outlet aperture in the sleeve is adapted to be positioned in fluid communication with an outlet on a valve body when mounted therein. At least one flow stabilizing insert is arranged at a predetermined point in the flow passageway between the at least one inlet aperture in the first disc and the at least one outlet aperture in the sleeve. The at least one insert is arranged in the at least one passage aperture in the second disc and extends with one end near the interface between the discs.

9 Claims, 2 Drawing Figures

FAUCET VALVE

BACKGROUND OF THE INVENTION

The present invention relates to a faucet valve adapted for removable insertion in a valve body used for control of the flow of fluid through a faucet. The valve includes control elements made of two discs in intimate movable contact with one another along a common interface. One disc is fixed in position and is provided with one or several inlet apertures for connection at one end to the inlet channel of a valve body. The other end of each inlet aperture is set against the adjacent face of the second disc. The second disc is movably arranged on the first disc and has one or several passage apertures which can be partially or completely overlapped with the inlet apertures in the first disc or shutoff or blocked by means of the surface of the first disc where apertures are not located. Both discs are housed in a sleeve and the combination is connected to one end of a spindle. The combined sleeve, discs and spindle as a unit can be removably inserted into and out of a valve body. The sleeve has at least one outlet aperture adapted to be in communication with the valve body outlet when inserted therein. Inserts for stabilizing the flow through the valve are arranged at a predetermined position in the passageway between the inlet apertures in the first disc and the outlet apertures of the sleeve.

Valves for controlling the rate of flow of fluid from an inlet to an outlet are well known, particularly in the faucet or plumbing fixture art. Examples are present in Swiss Pat. No. 574,067 and U.S. Pat. No. 3,834,416. In accordance with known prior art teachings of this type, a first and second ceramic disc are employed and are tightly positioned against one another to create a common interface. Each disc has a number of apertures so that the fluid can flow from inlet to outlet when the apertures of the two discs are overlapped to be partially or fully aligned. If the apertures in the two discs are shifted so that they are no longer at all in alignment, interruption of fluid flow is the result. As shown in the above patents, it is common in the art to provide a valve where the first or upper disc is maintained stationary and the second or lower disc is rotatable about an axis perpendicular to the interface between the discs and without having to space the discs from one another. A clamp or a spider having a number of fingers or legs is a part of the rotational structure and engages against the peripheral surface of the lower disc distal from the upper disc to cause the lower disc to be rotated when the clamp or spider is rotated. In this manner, it is possible to change the relative positions of the apertures in the lower disc in relation to the corresponding apertures in the upper disc. The clamp is connected with a spindle extending through central apertures of the discs.

Designs of this type are clearly workable in principle as experience has proven. However, they are noise-sensitive because of the comparably high flow speeds and turbulences at the control edges of the disc apertures in the flow path between the inlet and outlet. This is caused by relatively small operating cross sections. Therefore, inserts of a number of wire gratings in the form of screens are arranged in designs of the conventional type between the upper disc and the outlet for reducing noises. The effect is a certain flow stabilization. However, there is still room for further reduction in the noise level especially during the throttling and shutting phases of operation of the faucet valve.

SUMMARY OF THE INVENTION

The present invention is designed to further reduce the noise and operation of a faucet valve especially during the throttling and shutting phases in operation of the faucet. In general, the valve is of the type discussed above and as taught by the above referenced patents and is designed to guarantee a safe mode of operation in spite of a very simple design. In the embodiment depicted and described below, in contrast to the designs in the above referenced patnets, the movable disc is positioned at the top and the non-movable disc at the bottom. However, it is contemplated that the arrangement of the discs could be reversed so that it corresponds to the arrangement in the above referenced patents without departing from the advantages and design of the present invention.

In the present invention, noise reduction is achieved by locating inserts, as flow stabilizers, in the passage apertures of the upper or second disc. They extend at one end near the interface between the discs which lie on top of one another.

With the present design, the noise level is clearly lower than prior known arrangements employing inserts of this type. This is especially true during the throttling and closing phases in operation of the faucet. A considerable flow stabilization is provided in the passage area from the lower disc apertures to the apertures of the upper disc. The inserts are in the form of a well known type of screen and, for avoiding dirt, it has been found to be practical to use inserts in the form of vertically arranged screen walls in a predetermined configuration.

For example, the inserts can be shaped in the form of a screen wall, folded several times about vertical fold lines.

In accordance with the present invention, one end of the inserts are based in one direction by engagement between the bottom of lateral protrusions extending partially along their longitudinal sides and the upper surface of the movable disc surrounding the passage apertures in the movable disc in order to prevent the lower ends of the inserts from touching the sealing surface or interface with the non-movable disc.

Furthermore, the upper end of each insert is based on the bottom side of an external lateral collar of the spindle for securing the position of the insert.

A further characteristic of the present invention provides that each disc of the pair of discs has a central recess on its side opposite to the interface with other disc. A leaf spring contacts the surfaces forming the recess in the non-movable disc and a retaining ring is arranged in the sleeve to capture the leaf spring. The retaining ring has ends located in receiving recesses in the sleeve. The movable disc has the surface forming its recess in contact and mounted to the lower end of the spindle.

Furthermore, the present invention provides for stops at the upper end of the sleeve for limiting the rotation of the spindle and thus of a valve handle which is mounted on the spindle. A stop ring connected with a grooved part of the spindle is in position to cooperate with the stops on the sleeve to limit the rotation of the spindle. The stop ring is positioned between the upper end of the sleeve and a retaining ring on the spindle.

Also, a friction ring is positioned between the movable disc and an internal collar of the sleeve. The friction ring has dogs at the bottom which catch in the central recess of the movable disc. The result of the above advantages of the present valve is to provide a low cost structure which reduces noise level and can be easily introduced into and removed from a valve body.

DETAILED DESCRIPTION

Figure 1:
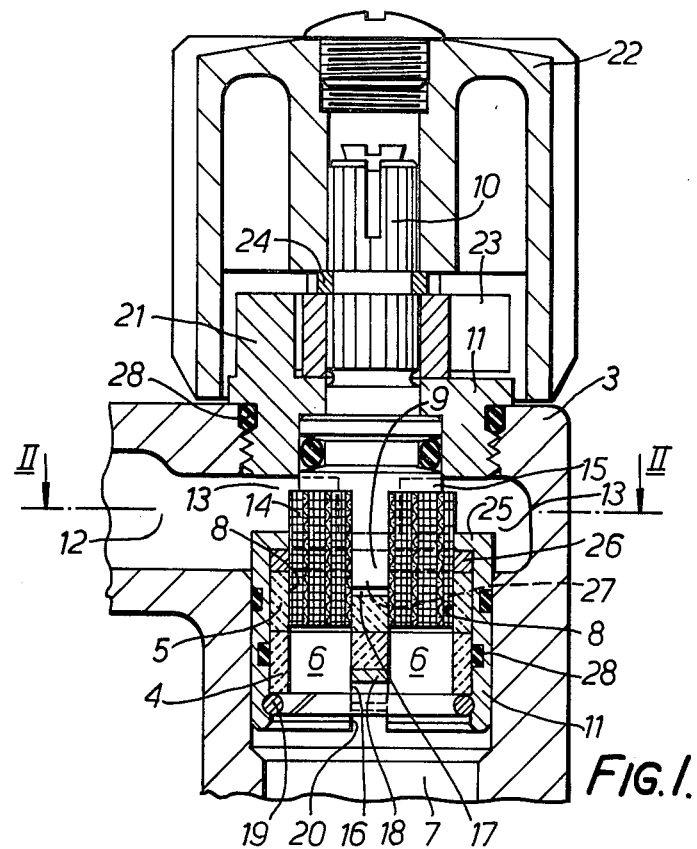
FIG. 1 is a longitudinal sectional view of the valve of the invention mounted in a valve body of a faucet.
Figure 2:
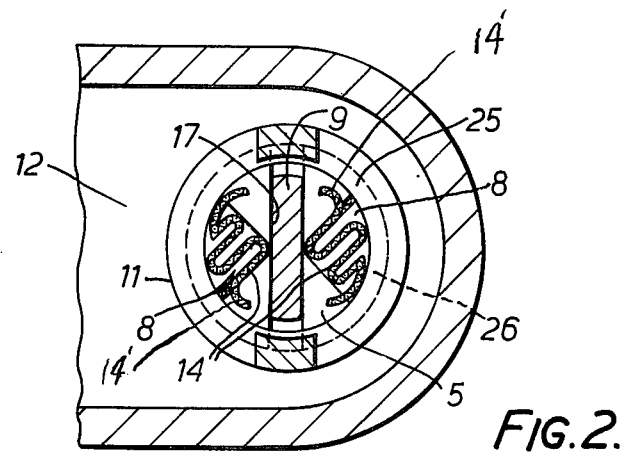
FIG. 2 is a sectional top view thereof taken along the plane of line II—II of FIG. 1.

The depicted faucet embodiment is of the type which employs a shutoff valve for warm or cold water and includes a valve body 3. Valve control elements in the form of two discs 4 and 5 lying tightly one on top of the other to form an interface are positioned in valve body 3. The first or lower disc 4 is nonmovably arranged in fixed position and is provided with two inlet apertures 6 connected with the inlet channel 7 of valve body 3 at one end and set against the second or upper disc 5 at the other end. Disc 5 is arranged movably on lower disc 4 and is equipped with two passage apertures 8 which can be partially or completely overlapped and aligned with the inlet apertures 6 of the lower disc 4 or can be shifted to a shutoff or closed position with the apertures 8 out of alignment with inlet apertures 6 and exposed to the surface of disc 4. Discs 4 and 5 are housed in a sleeve 11. Disc 5 is connected with the lower end 9 of a spindle 10. The interconnected spindle, discs and sleeve form a unitary structure which can be removed and inserted with respect to the valve body 3 as desired. Discs 4 and 5 are preferably formed of the conventional ceramic material as discussed in the above referenced patents. The sleeve has two outlet apertures 13 which are in position to communicate with the valve body outlet 12.

Inserts 14, formed out of screen material of the type discussed in the above referenced patents, are arranged in the flow passage between the inlet apertures 6 in the lower disc 4 and the outlet apertures 13 of sleeve 11 for stabilizing flow. This arrangement is depicted in the drawings. Inserts 14 are partially located in the passage apertures 8 of upper disc 5 and extend at their lower end near to the interface between discs 4 and 5. The inserts are formed of screen walls, folded several times about vertical fold lines. Protruding free edges 14' extend for a portion of the longitudinal height of each screen and the bottom of free edges 14' extend laterally beyond the aperture 8 to engage with the upper surface of disc 5. Thus, the screens are based or fixed at a point along their longitudinal sides on the upper rim of the movable disc 5 surrounding the passage apertures 8 in the movable disc 5. The upper end of each insert is based and rests against the bottom side of an external lateral collar 15 of spindle 10.

Each pair of discs 4 and 5 have similar configurations and each has a central recess on the side opposite to the interface with the remaining disc. For example, disc 4 has recess 16 and disc 5 has recess 17. Non-movable disc 4 is equipped at the bottom with a recess 16 which is contacted by leaf spring 18 resting on retaining ring 19. The retaining ring is arranged in a terminal area of sleeve 11 and has its end caught in recesses 20 of sleeve 11. Movable disc 5 is provided with a similar recess 17 at the top for contact and interengagement with the lower end of spindle 10.

On the upper end of sleeve 10 are stops 21 for the rotation-stop of spindle 10 and accordingly valve handle 22 mounted on spindle 10. Stops 21 cooperate with a stop-ring 23 connected with a grooved part of spindle 10 and positioned between the upper end of sleeve 11 and a retaining ring 24 on the spindle 10.

As depicted, a friction ring 26 is arranged between the movable disc 5 and an internal collar 25 of sleeve 11. The friction ring has dogs 27 at its bottom end catching in surfaces in the central recess 17 of the movable disc. Various O-rings 28 are provided for different sealing functions.

It is contemplated that valves of the present type can be used in other well known types of valve environments relating both to simple stationary valves and to more complex types of mixing valves.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A valve adapted for removable insertion in a valve body used for the control of flow in a plumbing fixture comprising; first and second discs in intimate movable contact with one another along a common interface, the first disc provided with at least one inlet aperture therethrough adapted to be positioned at one end in fluid communication with the inlet channel of a valve body and at the other end adjacent face of the second disc, the second disc having at least one passage aperture therethrough positioned so that relative movement between the discs will direct the apertures therein between the blocked shut-off position with the apertures out of alignment and the partially and completely overlapped positions where fluid can flow through the discs, the discs being mounted in a sleeve and the discs and sleeve being connected to one end of a spindle, the interconnected discs, sleeve and spindle being removably mounted in a valve body, at least one outlet aperture in the sleeve adapted to be positioned in fluid communication with an outlet on a valve when mounted therein, at least one flow stabilizing insert arranged at a predetermined point in the flow passageway between the at least one inlet aperture in the first disc and the at least one outlet aperture in the sleeve, the at least one insert being arranged in the at least one passage aperture in the second disc and extending with one end near the interface between the discs.

2. The invention in accordance with claim 1 wherein the first disc is mounted in fixed position and the second disc is arranged movably with respect to the fixed first disc, and the second disc being connected to the spindle.

3. The invention in accordance with claim 1 wherein each insert consists of at least one vertically arranged screen.

4. The invention in accordance with claim 3 wherein each insert consists of a screen folded several times about vertical fold lines.

5. The invention in accordance with claim 1 wherein each insert has a portion thereof resting on the rim surrounding the passage aperture in which it is mounted on the side of the second disc distal from the first disc.

6. The invention in accordance with claim 1 wherein the end of each insert distal from the interface between the discs rests against a laterally extending external collar on the spindle.

7. The invention in accordance with claim 2 wherein each disc has a central recess on its side opposite to the interface with the other disc, the recess in the first disc contacting a leaf spring captured by a retaining ring, a plurality of recesses in the end of the sleeve distal from the outlet end, the ends of the retaining ring captured in the recesses in the sleeve and engaging and retaining the leaf spring in position in contact with the recess in the first disc, the one end of the spindle mounted in the recess in the second disc.

8. The invention in accordance with claim 1 wherein a plurality of stops are positioned on the end of the sleeve adjacent to the second disc, the stops being in position to limit the angular rotation of the spindle, a valve handle mounted on the spindle for rotation therewith, a stop-ring connected to the spindle in position to cooperate with the stops and being positioned between the end of the sleeve adjacent to the second disc and a retaining ring on the spindle.

9. The invention in accordance with claim 1 wherein a friction ring is arranged between the second disc and an internal collar of the sleeve, the friction ring having dogs extending from the side thereof distal from the collar of the sleeve which engage with the second disc at the central recess thereof.

* * * * *